US011692450B2

(12) United States Patent
Laroche

(10) Patent No.: US 11,692,450 B2
(45) Date of Patent: Jul. 4, 2023

(54) LABYRINTH SEALING JOINT FOR AN AIRCRAFT TURBOMACHINE

(71) Applicant: SAFRAN AIRCRAFT ENGINES, Paris (FR)

(72) Inventor: Clément Raphaël Laroche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 133 days.

(21) Appl. No.: 17/253,070

(22) PCT Filed: Jun. 11, 2019

(86) PCT No.: PCT/FR2019/051400
§ 371 (c)(1),
(2) Date: Dec. 16, 2020

(87) PCT Pub. No.: WO2019/243708
PCT Pub. Date: Dec. 26, 2019

(65) Prior Publication Data
US 2021/0215056 A1      Jul. 15, 2021

(30) Foreign Application Priority Data

Jun. 20, 2018   (FR) ...................... 1855418

(51) Int. Cl.
*F01D 11/02* (2006.01)
*F01D 11/00* (2006.01)
*F16J 15/44* (2006.01)

(52) U.S. Cl.
CPC ............ *F01D 11/02* (2013.01); *F01D 11/001* (2013.01); *F05D 2220/323* (2013.01); *F05D 2240/55* (2013.01); *F16J 15/444* (2013.01)

(58) Field of Classification Search
CPC .... F16J 15/00; F16J 15/16; F16J 15/50; F16J 15/52; F16J 15/44; F16J 15/444;
(Continued)

(56) References Cited

U.S. PATENT DOCUMENTS

2014/0072415 A1*  3/2014  Zheng ..................... F01D 11/08
                                                                  277/412
2018/0010467 A1*  1/2018  Zhang ..................... F01D 5/225

FOREIGN PATENT DOCUMENTS

EP          1413712 A1     4/2004
EP          2982832 A1     2/2016
WO     WO-2014054440 A1 *  4/2014  ........... F04D 17/122

OTHER PUBLICATIONS

International Search Report dated Dec. 16, 2019, issued in corresponding International Application No. PCT/FR2019/051400, filed Jun. 11, 2019, 6 pages.
(Continued)

Primary Examiner — Nathan Cumar
(74) Attorney, Agent, or Firm — Christensen O'Connor Johnson Kindness PLLC

(57) ABSTRACT

A labyrinth sealing joint for a turbomachine, for example of an aircraft, includes a rotor element extending about an axis (A), and a stator element extending around the rotor element, the rotor element having two annular lips extending radially outwards and surrounded by at least one abradable element carried by the stator element. A plurality of gas passage cavities are arranged circumferentially next to one another between the two lips which are interconnected by connecting partitions, wherein at least one of the lips has at least one axial gas passage opening that leads into at least some of the cavities, wherein the partitions extend substantially axially between the lips and define sectors of gas
(Continued)

passage spaces between them, the sectors of spaces being divided by separation walls for forming the cavities.

16 Claims, 3 Drawing Sheets

(58) Field of Classification Search
CPC .... F16J 15/447; F16J 15/4472; F16J 15/4474; F16J 15/4476; F16J 15/4478; F01D 11/00; F01D 11/001; F01D 11/02; F01D 11/025; F01D 11/04; F01D 11/06; F01D 11/08; F01D 11/10; F01D 11/12; F01D 11/122; F05D 2220/00; F05D 2220/10; F05D 2220/30; F05D 2220/31; F05D 2220/32; F05D 2220/321; F05D 2220/3212; F05D 2220/3213; F05D 2220/3215–3219; F05D 2220/323; F05D 2240/00; F05D 2240/55
USPC .......................................................... 277/412
See application file for complete search history.

(56) References Cited

OTHER PUBLICATIONS

Written Opinion of the International Searching Authority dated Dec. 16, 2019, issued in corresponding International Application No. PCT/FR2019/051400, filed Jun. 11, 2019, 6 pages.

\* cited by examiner

LABYRINTH SEALING JOINT FOR AN AIRCRAFT TURBOMACHINE

TECHNICAL FIELD

Embodiments of the present disclosure relate to a labyrinth sealing joint for a turbomachine, in particular an aircraft.

BACKGROUND

The prior art comprises documents EP-A1-1413712, US-A1-2018/010467 and US-A1-2014/072415.

It is known to equip a turbomachine with labyrinth sealing joints, which are sealing joints, the dynamic sealing of which is ensured by rotating lips. As shown in FIG. 1, the lips 12 are carried by a rotor element 14 of the turbomachine 10, which rotates inside a stator element 16 and are surrounded by abradable elements 18 such as blocks or a coating of abradable material carried by this stator element 16.

The abradable elements 18 are intended to protect the lips 12 from wear by contact with the stator element 16 surrounding them. The contact with the abradable elements 18 can be avoided or, on the contrary, can be sought, for example, to minimize the radial clearances J around the lips. The types of abradable elements 18 and lips 12 can be adapted accordingly.

This technology can be used to ensure a sealing of the tops of the blades of a rotor wheel, these blades carry annular, possibly sectorized lips, which are surrounded by abradable elements carried by a stator casing (see in particular FR-A1-3 001 759). It can also be used to provide a sealing between a portion of the shaft or trunnion and a stator of the turbomachine. The number and dimensions of the lips depend in particular on the radial space available between the elements to be sealed.

During operation, as shown in FIGS. 2 and 3, the function of the lips 12 is to disturb the gas stream that tries to flow between elements 14, 16 from upstream to downstream, i.e. from left to right in the drawings. This creates turbulence in the gas stream which generates pressure drops and thus improves the sealing of the sealing joint.

At the level of each lip 12 to be crossed, the gas stream is disturbed a first time when it impacts the body of the lip (arrow F1). The gas stream crosses the gap between the top of the lip 12 and the abradable element 18 surrounding it, this stream being reduced by the value J thanks to the disturbance created by the lip, then is disturbed a second time (arrow F2) following the sudden increase in the passage section after crossing the lip. The greater the number of lips 12, the more turbulence is generated in the gas stream, and the better the sealing joint is improved.

The present disclosure proposes an improvement to this technology to improve the sealing of the sealing joint in a simple, efficient and economical way.

SUMMARY

The disclosure provides a labyrinth sealing joint for a turbomachine, in particular of an aircraft, comprising a rotor element extending around an axis, and a stator element extending around the rotor element, the rotor element comprising two annular lips extending radially outwards and surrounded by at least one abradable element carried by the stator element, characterized in that a plurality gas passage cavities are arranged circumferentially next to one another between the two lips which are interconnected by connecting partitions, and in that at least one of the lips has at least one axial gas passage opening that leads into at least some of the cavities.

The present disclosure can use only two lips to ensure sealing between a rotor and a stator. These lips can replace a multitude of adjacent annular lips of the prior art, which is advantageous.

The air passage cavities are located between the lips (or between two annular walls, respectively upstream and downstream, of the lip when it is considered unique) and are arranged circumferentially. They open radially outwards, facing the abradable element and are internally delimited by a bottom or an annular surface extending between the lips and which is preferably cylindrical.

These cavities define or are part of "bathtubs" in which gas streams can circulate and are advantageously disturbed or pressurized.

At the level of each lip to be crossed, the gas stream is disturbed a first time when it impacts the body of the upstream lip. The gas stream crosses the radial clearance at the top of the upstream lip and penetrates and circulates in the cavities where it is disturbed a second time and can undergo various phenomena (disturbances, pressurization, vortices, etc.). These phenomena create turbulence which improves the performance of the sealing joint. The gas stream continues its course and is then disturbed a third time, due in particular to the increase in the passage section after crossing the downstream lip.

The disclosure thus makes it possible to significantly increase the sealing level of the sealing joint.

In accordance with the disclosure, the partitions can extend substantially axially between the lips and define therebetween sectors of spaces for gas passage, the sectors of spaces being divided by separation walls to form the cavities.

The sealing joint according to the disclosure may comprise one or more of the following features, taken in isolation from each other or in combination with each other:
- the rotor element is monobloc,
- at least one of the cavities is formed by a plurality of separation walls that surround it,
- the separation walls have a height or radial dimension with respect to the axis at most equal to that of the lips,
- the lips and the partitions have the same height or radial dimension with respect to the axis,
- the lips comprise an upstream lip and a downstream lip, only the upstream lip comprising axial gas passage openings which lead into cavities or sectors of space, or the upstream and downstream lips both comprising axial gas passage openings which lead into cavities or sectors of space,
- the upstream lip comprises at least one, preferably one to three, gas passage openings, which lead into each cavity or sector of space,
- the upstream lip comprises a single gas passage opening that leads into each cavity or sector of space, and the downstream lip comprises a single gas passage opening that leads into each cavity or sector of space, these openings being circumferentially offset from each other,
- the rotor element comprises a disc whose outer periphery is connected to two annular flanges, respectively upstream and downstream, the outer periphery comprising an outer cylindrical surface on which the lips are protrudingly formed.

The present disclosure also concerns a turbomachine, characterized in that it comprises at least one sealing joint as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
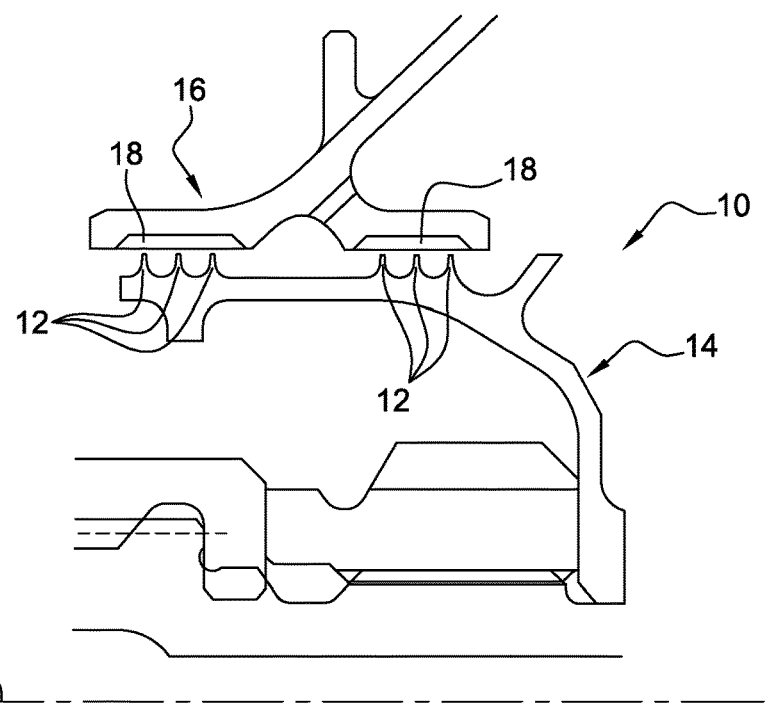
FIG. 1 is a schematic axial section half-view of a turbomachine labyrinth sealing joint, according to the prior art.
Figure 2:
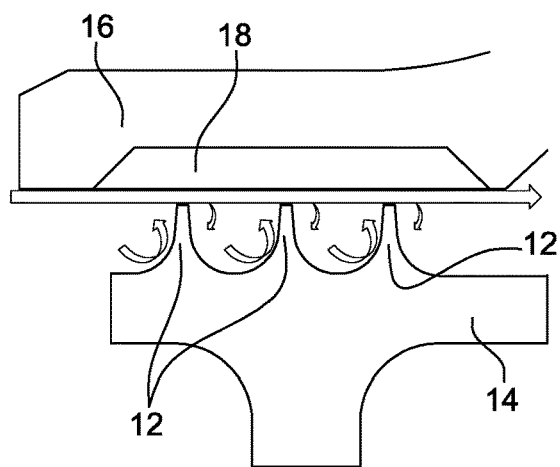
FIGS. 2 and 3 are schematic views at larger scales of detail of FIG. 1.
Figure 3:
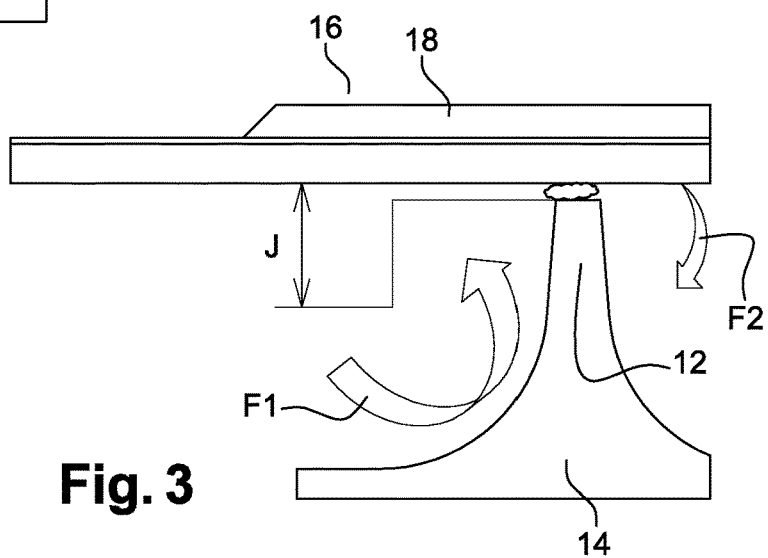

FIGS. 1 to 3 have been described above.

Figure 4:
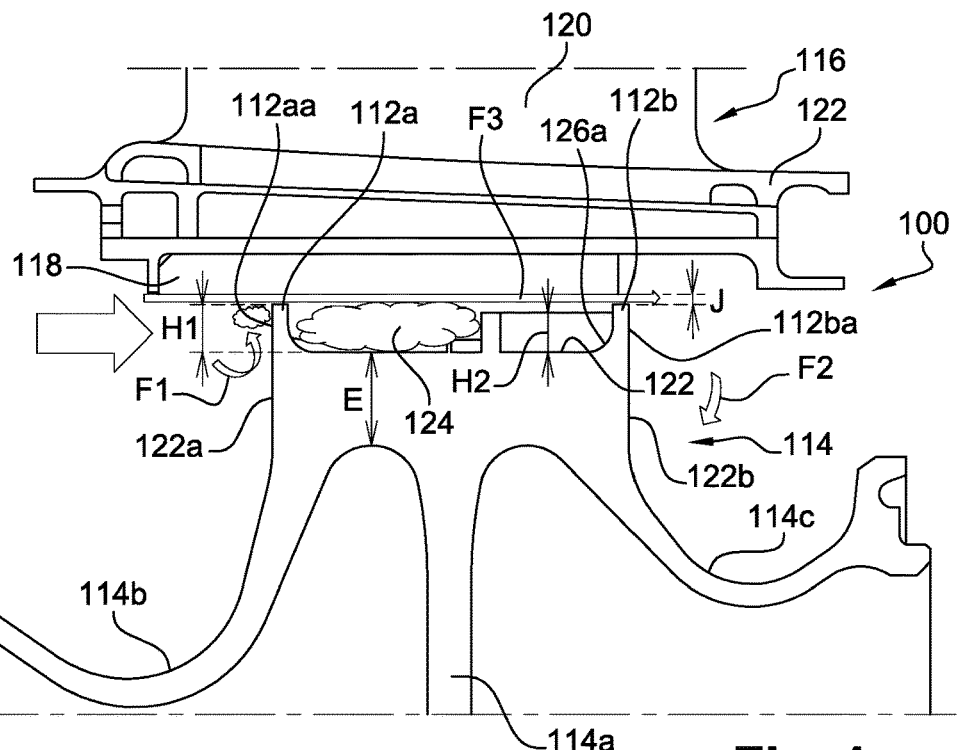
FIG. 4 is a partial schematic half-view in axial section of a turbomachine labyrinth sealing joint, according to the disclosure.
Figure 5:
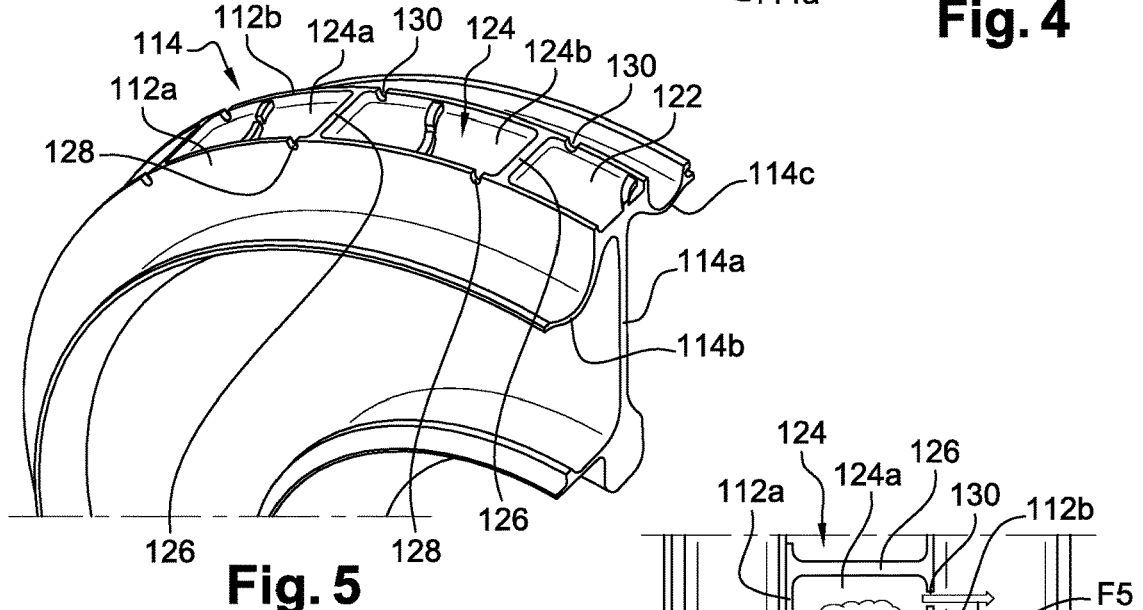
FIG. 5 is a schematic perspective and axial section view of a rotor element of the sealing joint of FIG. 4.
Figure 6:
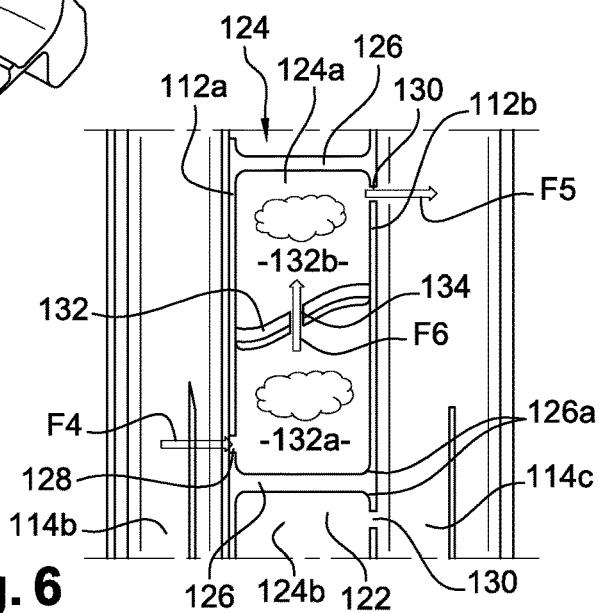
FIG. 6 is a schematic top view of the rotor element of the sealing joint of FIG. 4.

FIGS. 4 to 6 represent a first embodiment of a labyrinth sealing joint 100 for a turbomachine, in particular for an aircraft.

The sealing joint 100 comprises a rotor element 114 rotating around an axis of rotation, which is not visible and which will be designated by A, and a stator element 116 extending around the rotor element 114.

In the example shown, the stator element 116 is a turbine nozzle that comprises two annular shrouds between which an annular row of stator blades 120 extends. Only the radially inner shroud 122 is visible here. This shroud is generally cylindrical or frustoconical in shape and carries on its internal periphery an abradable annular element 118 which surrounds the rotor element 114 with a small radial clearance J.

This rotor element 114 is here a rotor disc which can be monobloc, i.e. it extends continuously over 360° around its axis A. It comprises an annular wall 114a extending around the axis with an opening in the center. As can be seen in FIG. 5, this wall has a "leek" shape in cross-section, which is well known to the skilled in the art.

The wall 114a is connected at its outer periphery to two annular flanges, respectively upstream 114b and downstream 114c. The upstream flange 114b has in axial section a general curved shape, the concavity of which is oriented radially outwards with respect to the axis A. The flange 114b has a downstream end connected to the outer periphery of the wall 114a and a free upstream end which can be attached to a rotor wheel located upstream of the element 114. The downstream flange 114b also has a generally curved shape in axial section with the concavity facing radially outward from the axis A. The flange 114c has an upstream end connected to the outer periphery of the wall 114a and a free downstream end that can be attached to a rotor wheel located downstream of the element 114.

The outer periphery of the wall 114a is thickened both radially and axially in the example shown to define a radially outer cylindrical surface 122. This surface 122 here has an axial dimension L greater than the minimum axial thickness of the wall 114a and substantially equal to the maximum axial thickness of this wall (FIG. 5). The outer periphery of the wall 114a also has a radial thickness E greater than the average radial thickness of the flanges 114b, 114c, which is for example measured at a distance from their axial ends.

Two annular lips 112a, 112b are protruding from the surface 122 and extend radially outwards. They are substantially parallel to each other and to a plane perpendicular to the axis A. They are located respectively at the axial ends of the surface 122. The upstream lip 112a has an upstream radial face 112aa which is radially aligned with an upstream radial face 122a of the outer periphery of the wall 114a. The downstream lip 112b has a downstream radial face 112ba that is radially aligned with a downstream radial face 122b of the outer periphery of the wall 114a.

The radially outer tops or ends of the lips are separated by the clearance J located between the rotor element 116 and the abradable element 118.

The lips 112a, 112b define between them an annular space 124 which is sectorized and formed by several sectors of space 124a, 124b, etc. isolated and arranged circumferentially next to one another around the axis A.

The lips 112a, 112b are connected to each other by partitions 126 which are here parallel to each other and oriented axially, i.e. parallel to the axis A. As can be seen in FIGS. 5 and 6, the partitions 126 isolate the sectors of spaces 124a, 124b from each other.

In the example shown, the lips 112a, 112b and the partitions 126 have the same height H1 or radial dimension, measured here from the cylindrical surface 122. The partitions 126 thus have their tops separated by the clearance J of the abradable element 118.

The partitions 126 can be connected to the lips 112a, 112b as well as to the surface 122 by fillets 126a (FIGS. 5 and 6).

A sector of space 124a, 124b is thus delimited on the one hand by axially aligned portions of lips 112a, 112b and on the other hand by two adjacent partitions 126 extending between these portions. Each sector of space thus has the shape of a "bathtub".

In the embodiment of FIGS. 5 and 6, each sector of space 124a, 124b is in fluid communication on the one hand upstream, via an opening 128 provided on the upstream lip 112a, and on the other hand downstream, via an opening 130 provided on the downstream lip 112b.

The openings 128, 130 are here formed by radial notches extending from the tops of the lips over approximately all their heights. The openings 128, 130 are not aligned axially but are on the contrary offset from each other in the circumferential direction, as shown in FIG. 6. The opening 128 may lead into the vicinity of one of the circumferential ends of the sector of space 124a, 124b, and the other opening 130 may lead into the vicinity of the circumferential end opposite to that sector of space.

The opening 128 allows the gas passage in operation, from the upstream to the downstream, following the arrow F4, i.e. from the upstream of the upstream lip 112a to the sector of space 124a, 124b. The opening 130 allows the gas passage in operation, from upstream to the downstream, following the arrow F5, thus from the sector of space 124a, 124b to the downstream of the downstream lip 112b.

Within the sector of space 124a, 124b, the separation walls 132 are provided. In the example shown, each sector of space comprises a wall 132 which has a generally corrugated shape and comprises an upstream end connected to the downstream radial face of the upstream lip 112a and a downstream end connected to the upstream radial face facing the downstream lip 112b. The wall 132 is located substantially in the middle of the sector of space, in the circumferential direction, and comprises a through hole 134 oriented here in a substantially circumferential direction.

The wall 132 has here a radial height H2, measured from the surface 122, which is less than that of H1 of the lips 112a, 112b and partitions 126. The wall 132 separates the space into two cavities 132a, 132b in fluid communication via the bore 134.

The shapes and dimensions of the wall 132 and the bore 134 are determined to control the disturbance of the incoming and outgoing gas stream in each sector of space.

The openings 128, 130 are advantageously calibrated. The cavities 132a, 132b could lose their curvilinear side or reduce in spacing in places in order to increase the pressure between two shapes to expel a more compressed gas stream between the rotor and the stator. The shapes can be aerodynamic or on the contrary tapered to smooth the stream in some places or amplify the disturbance to others (depending on upstream/downstream needs).

At the level of the lip 112a, the gas stream is disturbed a first time when it impacts the lip (arrow F1). A first part of the gas stream crosses the radial clearance at the top of the lips 112a, 112b (arrow F3) then is disturbed a second time following the increase of the passage section downstream of the lips (arrow F2). On the other hand, a second part of the gas stream enters sectors of space 124a, 124b (arrow F4) and circulates there being disturbed, which generates turbulence and impacts the first part of the gas stream, whose flow rate is reduced.

Figure 7:
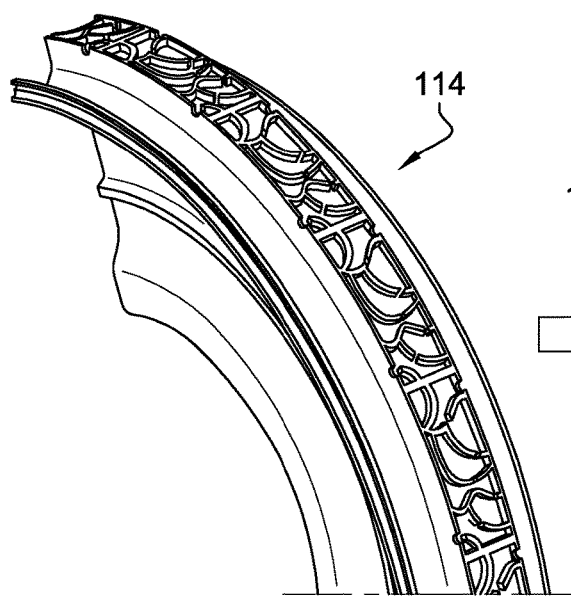
FIGS. 7 and 8 are views similar to those in FIGS. 5 and 6 and illustrating a variant of the embodiment of the disclosure.
Figure 8:
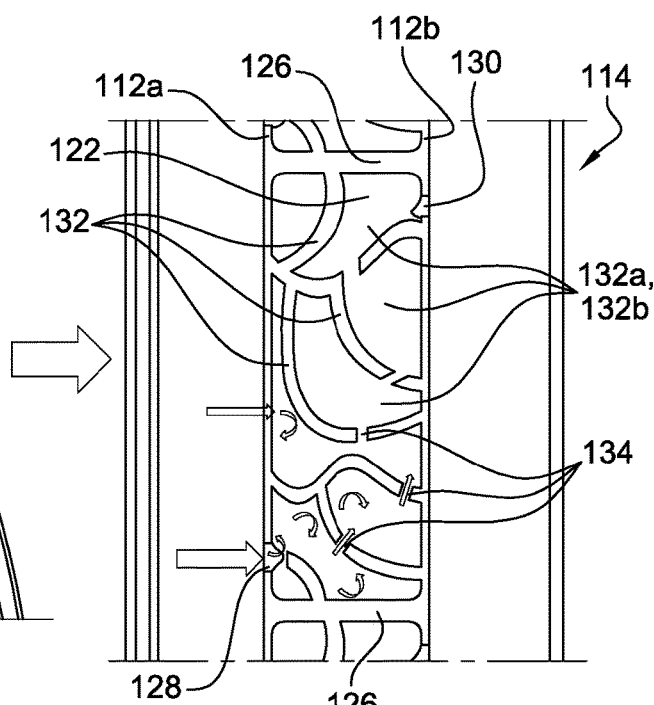

FIGS. 7 and 8 illustrate a second embodiment of the disclosure which differs from the previous embodiment by the characteristics of the separation walls 132. Each sector of space comprises a large number of walls 132, for example greater than 5, which have complex shapes and delimit several cavities 132a, 132b, etc., the number of which may also be greater than 5. Some of the walls 132 comprise bores for the fluid communication of the cavities between them and for the routing of the gas stream from the opening 128 to the opening 130 of each sector of space. The walls 132 here has the same radial height as the lips and partitions.

Figure 9:
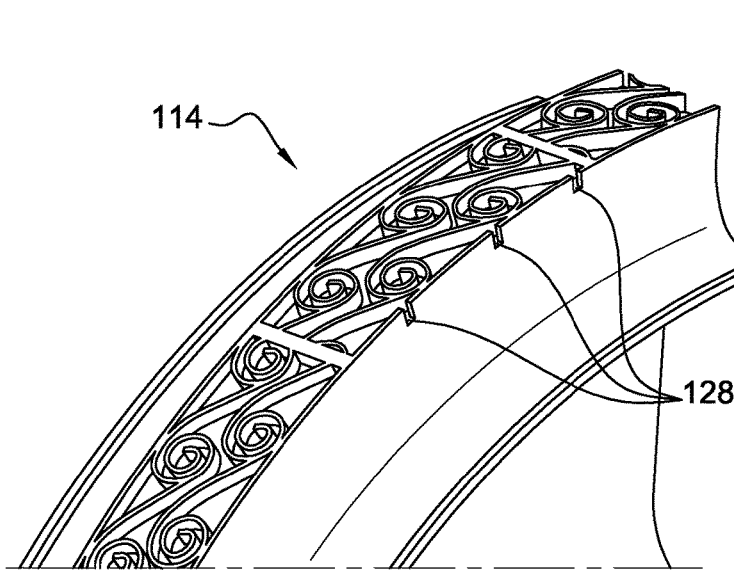
FIGS. 9 and 10 are views similar to those in FIGS. 5 and 6 and illustrate another variant of the embodiment of the disclosure.
Figure 10:
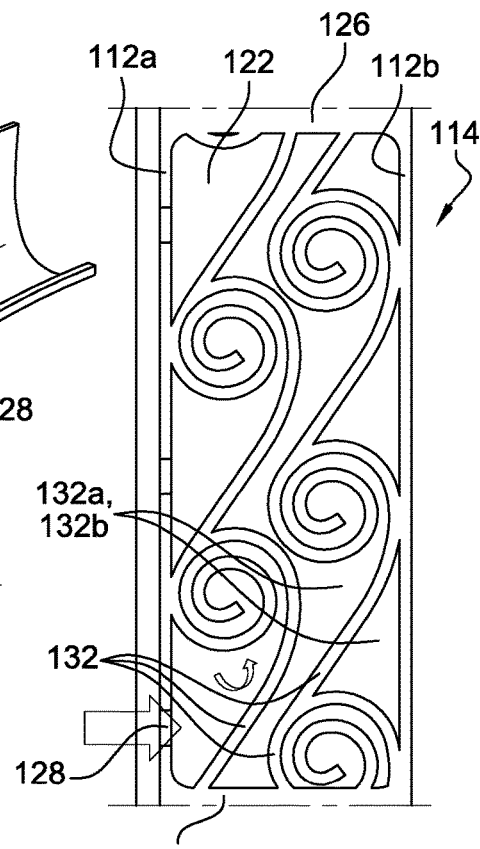

FIGS. 9 and 10 illustrate a third embodiment of the disclosure which differs from the first embodiment in particular by the characteristics of the separation walls 132. Each sector of space comprises a large number of walls 132, for example greater than 5, each of which has a general volute shape and each of which delimits a helical cavity 132c, the number of which may also be greater than 5. In the example shown, the space between lips 112a, 112b comprises two adjacent annular rows of volute walls 132. The walls 132 are not pierced here. On the other hand, only the upstream lip 112a comprises openings 128, here three openings per sector of space 124a, 124b. The downstream lip 112b thus does not include openings and the cavities 132c do not communicate fluidly with each other through bores in the walls 132. The gases that enter cavities 132c through the openings 128 are forced to follow the volute or helix shape which generates the formation of vortices in each sector of space, which disturbs and limits the flow rate of fluid according to the arrow F3 in FIG. 4.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A labyrinth sealing joint for a turbomachine, the labyrinth sealing joint comprising a rotor element extending around an axis, and a stator element extending around the rotor element, the rotor element comprising:
   two annular lips extending radially outwards and surrounded by at least one abradable element carried by said stator element, at least one of said two annular lips comprising at least one axial gas passage opening;
   a plurality of gas passage cavities being arranged circumferentially next to one another between the two annular lips, the least one axial gas passage opening leading into at least some of said gas passage cavities;
   a plurality of partitions interconnecting the two annular lips, said partitions extending axially between the annular lips and defining therebetween sectors of spaces for gas passage,
   wherein said sectors of spaces are divided by separation walls to form said gas passage cavities,
   wherein said two annular lips and said partitions have a same height with respect to said axis.

2. The labyrinth sealing joint according to claim 1, wherein said rotor element is monobloc.

3. The labyrinth sealing joint according to claim 1, wherein at least one of the gas passage cavities is formed by a plurality of the separation walls.

4. The labyrinth sealing joint according to claim 3, wherein said separation walls have a height with respect to said axis at most equal to a height of said two annular lips.

5. The labyrinth sealing joint according to claim 1, wherein said two annular lips comprise an upstream lip and a downstream lip, wherein either only the upstream lip comprising axial gas passage openings which lead into the gas passage cavities or sectors of spaces, or the upstream and downstream lips both comprise axial gas passage openings that lead into gas passage cavities or sectors of space.

6. The labyrinth sealing joint according to claim 5, wherein the upstream lip comprises at least one gas passage opening which leads into each gas passage cavity or sector of space.

7. The labyrinth sealing joint according to claim 6, wherein the upstream lip comprises a single upstream gas passage opening which leads into each gas passage cavity or sector of space, and the downstream lip comprises a single downstream gas passage opening which leads into each gas passage cavity or sector of space, the upstream and downstream gas passage openings being circumferentially offset from each other.

8. The labyrinth sealing joint according to claim 6, wherein the upstream lip comprises two or three gas passage openings which lead into each gas passage cavity or sector of space.

9. The labyrinth sealing joint according to claim 1, wherein said rotor element comprises a disc having an outer periphery connected to two annular flanges, respectively upstream and downstream, the outer periphery comprising an outer cylindrical surface on which said two annular lips are protrudingly formed.

10. A turbomachine, comprising a sealing joint according to claim 1.

11. The labyrinth sealing joint according to claim 1, wherein the sector of spaces are each delimited, on the one hand, by axially aligned portions of two annular lips, and on the other hand, by two adjacent partitions extending between these axially aligned portions of two annular lips.

12. The labyrinth sealing joint according to claim 1, wherein the separation walls have generally corrugated shape and comprises an upstream end connected to a downstream radial face of an upstream annular lip of the two annular lips and a downstream end connected to an upstream radial face facing a downstream annular lip of the two annular lips.

13. The labyrinth sealing joint according to claim 1, wherein the separation walls each comprise a through hole.

14. The labyrinth sealing joint according to claim 1, wherein each of the sector of spaces comprises a number of separation walls greater than five.

15. The labyrinth sealing joint according to claim 1, wherein the separation walls have a general volute shape and each of the separation walls delimits a helical cavity of the gas passage cavities.

16. A labyrinth sealing joint for a turbomachine, comprising a rotor element extending around an axis, and a stator element extending around the rotor element, the rotor element comprising:
  two annular lips extending radially outwards and surrounded by at least one abradable element carried by said stator element;
  a plurality of gas passage cavities being arranged circumferentially next to one another between the two annular lips, the two annular lips being interconnected by connecting partitions, at least one of said annular lips comprising at least one axial gas passage opening that leads into at least some of said gas passage cavities, and said connecting partitions extending axially between the annular lips and defining therebetween sectors of spaces for gas passage,
  wherein said sectors of spaces are divided by separation walls to form said gas passage cavities, and
  wherein said rotor element comprises a disc having an outer periphery connected to two annular flanges, respectively upstream and downstream, the outer periphery comprising an outer cylindrical surface on which said two annular lips are protrudingly formed.

* * * * *